United States Patent
Engel et al.

(10) Patent No.: US 12,313,831 B2
(45) Date of Patent: May 27, 2025

(54) PTYCHOGRAPHIC IMAGING SYSTEM AND METHOD FOR GENERATING IMAGES

(71) Applicant: Siemens Healthcare Diagnostics Inc., Tarrytown, NY (US)

(72) Inventors: Thomas Engel, Aalen (DE); Kalpesh Mehta, Singapore (SG)

(73) Assignee: SIEMENS HEALTHCARE DIAGNOSTICS INC., Tarrytown, NY (US)

( * ) Notice: Subject to any disclaimer, the term of this patent is extended or adjusted under 35 U.S.C. 154(b) by 267 days.

(21) Appl. No.: 17/761,593

(22) PCT Filed: Sep. 19, 2019

(86) PCT No.: PCT/IB2019/057901
§ 371 (c)(1),
(2) Date: Mar. 17, 2022

(87) PCT Pub. No.: WO2021/053374
PCT Pub. Date: Mar. 25, 2021

(65) Prior Publication Data
US 2022/0350123 A1    Nov. 3, 2022

(51) Int. Cl.
*G02B 21/06* (2006.01)
*G02B 21/36* (2006.01)
(52) U.S. Cl.
CPC ........... *G02B 21/06* (2013.01); *G02B 21/365* (2013.01)
(58) Field of Classification Search
CPC .... G02B 21/06; G02B 21/365; G02B 21/367; G02B 27/58

USPC ......................................................... 356/402
See application file for complete search history.

(56) References Cited

U.S. PATENT DOCUMENTS

| 2015/0054979 | A1 | 2/2015 | Ou et al. |
| 2016/0088205 | A1 | 3/2016 | Horstmeyer et al. |
| 2017/0146788 | A1* | 5/2017 | Waller .................... G06T 19/20 |
| 2017/0371141 | A1* | 12/2017 | Besley .................. G06T 3/4076 |
| 2018/0164567 | A1* | 6/2018 | Chan ..................... G02B 21/084 |

FOREIGN PATENT DOCUMENTS

| CN | 106707486 | A | | 5/2017 | |
| CN | 107645625 | A | * | 1/2018 | ............. G02B 21/06 |
| CN | 106707486 | B | * | 7/2019 | |

(Continued)

OTHER PUBLICATIONS

Bian, L. et al.: Content adaptive illumination for Fourier ptychography, Optics Letters, vol. 39, No. 23, Dec. 1, 2014, pp. 6648-6651; 2014.

(Continued)

*Primary Examiner* — Tri T Ton
(74) *Attorney, Agent, or Firm* — Dugan & Dugan, PC

(57) ABSTRACT

The invention relates to a ptychographic imaging system that includes a plurality of light sources adapted to emit light onto a sample location, wherein the light sources are arranged in a predefined pattern; the system also includes a controller adapted to control operation of the plurality of light sources; wherein at least one of a) the predefined pattern of the light sources and b) the operation of the plurality of light sources is adapted to compensate for geometric effects due to an arrangement of the light sources relative to the sample location.

13 Claims, 8 Drawing Sheets

(56) References Cited

FOREIGN PATENT DOCUMENTS

| | | |
|---|---|---|
| WO | WO 2015027188 A1 | 2/2015 |
| WO | WO2015179452 A1 | 11/2015 |
| WO | 2015187591 A1 | 12/2015 |
| WO | WO2016187591 A1 | 11/2016 |

OTHER PUBLICATIONS

Guo, K. et al.: Optimization of sampling pattern and the design of Fourier ptychographic illuminator, Optics Express, vol. 23, No. 5, pp. 6171-6180; 2015.
Li, S. et al.: "Predictive searching algorithm for Fourier ptychography", Journal of Optics, Institute of Physics Publishing, Bristol GB, vol. 19. No. 12, Nov. 23, 2017, p. 125605, XP020322254, ISSN: 2040-8986, DOI:10.1088/2040-8986/AA9505.
Ou, X. et al.: "High numerical aperture Fourier ptychography: principle, implementation and characterization", Optics Express, vol. 23, No. 3, Feb. 4, 2015, p. 3472, XP055698424; 2015.
Tian, L. et al.: Computational illumination for high-speed in vitro Fourier ptychographic microscopy, Optica vol. 2, No. 10, pp. 904-911; 2015.
Zhang, Y. et al.: "Self-learning based Fourier ptychographic microscopy", Optics Express, vol. 23, No. 14, Jul. 8, 2015, p. 18471, XP055498828, DO1: 10.1364/OE.23.018471; 2015.

* cited by examiner

PTYCHOGRAPHIC IMAGING SYSTEM AND METHOD FOR GENERATING IMAGES

CROSS REFERENCE TO RELATED APPLICATION

This is a 371 of PCT/IB2019/057901, filed Sep. 19, 2019, which is hereby incorporated by reference herein in its entirety for all purposes.

FIELD

The invention relates to a ptychographic imaging system and to a method for generating images using a ptychographic imaging system.

BACKGROUND

Imaging small structures requires optical systems with a high numerical aperture, NA. Digital imaging and fast computer systems offer the opportunity to generate high-resolution images by analytically merging low-resolution sub-images.

These computational methods of microscopic imaging comprise ptychography which generates images by processing coherent interference patterns that have been scattered from a sample. The sample or a wave field moves with respect to a constant function such as a field of illumination or an aperture stop. Fourier ptychography imaging systems are advantageous for having a large field of view and a high resolution. A large number of individual images are illuminated by different numerical aperture settings. Quasi collimated and thus (spatially) coherent illumination is used with large angles of incidence. From the point of view of the imaging lens, this corresponds to an illumination system with a single asymmetric subset at high numerical aperture setting.

Conventional Fourier ptychography systems use planar two-dimensional arrays of light emitting devices, LEDs. The light sources are arranged with the same pitch in both x and y directions, i.e., the distance between adjacent LEDs in the x-direction and the y-direction remains constant. The light sources are turned on one at a time and a respective low-resolution image is captured. The location of the light source relative to the sample determines the part of the Fourier spectrum being measured. For Fourier ptychography reconstruction, a requirement is to collect Fourier spectra with at least 50 percent overlap.

Conventional uniform LED arrays have the effect that due to the high angle of incidence, geometrical reduction of available power density at the sample plane becomes relevant. The reduction scales with the cosine of the angle of incidence and may have an important effect at high angles of incidence.

A further effect is that light sources further away from the central optical axis going through the sample provide redundant information. As a possible solution, non-uniform sampling has been proposed in Guo et al., "Optimization of sampling pattern and the design of Fourier ptychographic illuminator," Opt. Express 23, 6171-6180, 2015.

Another approach relates to regular arrangement in polar coordinates, as proposed in US 2017/0371141 A1.

Further, it is known to increase the throughput, that is to reduce the number of images required for reconstruction, by using multiple light sources at the same time to capture the low-resolution images. For example, US 2017/0146788 A1 relates to Fourier ptychographic microscopy with multiplexed illumination. US 2016/0088205 A1 relates to multiplexed Fourier ptychography imaging systems and methods. Another approach is known from Tian et al., "Computational illumination for high-speed in vitro Fourier ptychographic microscopy," Optica 2 (10), 904-911, 2015.

Another approach to increase the throughput is content adaptive illumination as known from Bian et al., "Content adaptive illumination for Fourier ptychography," Opt. Lett. 39, 6648-6651, 2014. According to this approach, relevant Fourier components are identified, and the corresponding light sources are selected for scanning. By only using a subset of images, some reduction in the number of required images is possible.

Because Fourier ptychographic imaging systems require the generation of multiple images at consecutive time points, there is always a need to further reduce the time required to generate all sub-images that are combined using stitching algorithms. At the same time, the quality of the images must stay high, i.e., the reduced time to generate the sub-images should not lead to a considerable deterioration in image quality.

It is therefore an objective of the present invention to provide a ptychographic imaging system and a method for generating images using a ptychographic imaging system which produces high-quality images in considerably short time.

SUMMARY OF THE INVENTION

This objective is solved by the subject matter of the independent claims, which are respectively directed to a ptychographic imaging system and a method for generating images using a ptychographic imaging system. Advantageous embodiments are set out in the dependent claims.

According to a first aspect, the invention therefore provides a ptychographic imaging system having a plurality of light sources and a controller. The light sources emit light onto a sample location. The light sources are arranged in a predefined pattern. The controller controls operation of the plurality of light sources. The predefined pattern of the light sources is chosen such that geometric effects due to an arrangement of the light sources relative to the sample location, which otherwise occurs for planar uniform arrangements, are at least partially compensated. Additionally or alternatively, the control operation of the light sources is adapted to compensate for the geometric effects due to the arrangement of the light sources relative to the sample location.

According to a second aspect, a method for generating images using a ptychographic imaging system is provided, comprising a plurality of light sources arranged in a predefined pattern. The plurality of light sources emit light onto a sample location comprising a sample. A controller controls operation of the plurality of light sources. The predefined pattern of the light sources and/or the control operation of the plurality of light sources is adapted to compensate for geometric effects due to an arrangement of the light sources relative to the sample location.

An optimized arrangement of the light sources can increase the throughput of the ptychographic imaging system as compared to conventional Fourier ptychographic systems with uniform pitch and sequential acquisition. Compensation for geometric effects may comprise compensation for distance effects and angular effects and may lead to a more constant and improved signal-to-noise performance over the full angular spectrum. The overall noise performance in the reconstructed image will improve. A preferred setting might be a constant noise and background level for all sub-images combined in a respective reconstruction.

An advantage of the present invention is that adaptive illumination and/or detection settings, e.g., arrangement of the light sources and/or light source brightness, provide optimized signal-to-noise ratio in the sub-images. Further, optimized image contrast in the sub-images due to optimized illumination and exposure control can be achieved. The ptychographic imaging system provides higher variability and flexibility. Furthermore, it is possible to weight and contrast different diffraction angles selectively. According to an embodiment, certain structures, particularly small structures and/or edges and/or transition regions can be accentuated, e.g., by providing a higher contrast. This effect is of particular advantage for taking pictures that are processed further by certain systems, e.g., using machine learning methods based on artificial intelligence or neural networks. These systems work better if the contrast is enhanced. A natural appearance is of less or no importance in these cases.

Preferably higher diffraction angles will be intensified relative to the central optical axis. Higher contrast images may be particularly advantageous for applications like lab diagnostics, e.g., hematology for samples which can be imaged multiple times, like fixed cells on a slide. The invention provides high-resolution imaging with high working distance and large depth of field for the reconstructed image typical for ptychographic systems.

As used in this invention, geometric effects to be compensated may comprise at least one of the following:

a) Angle-dependent spatial emission characteristics of the light sources, such as angular emission characteristics of profiles based upon the geometrical arrangement of the light source with respect to the sample location.

b) The cosine effect, namely the scaling of the available power density at the sample location with the cosine of the angle of incidence. The angle of incidence or azimuth angle of a light source is measured between a central optical axis and a line from the light source to the sample location, i.e., the optical axis of the specific light source. For planar arrangements of the light sources, the central optical axis of the arrangement of light sources is perpendicular to the plane and goes through the sample location. The arrangement of light sources may be symmetric relative to the central optical axis, e.g., in the form of a spherical cap. In this case, the arrangement of light sources selects the central optical axis.

c) The drop off of power level arising from the light source irradiating the object region under investigation is kept constant at least at the point on the optical axis either by an appropriate control of the light source and/or by its geometrical arrangement close to a spherical arrangement of light sources.

d) Higher diffraction angles lead to lower diffraction efficiencies. Compensation of the lower diffraction efficiencies can lead to a better resolution and/or higher contrast of small object features in the respective reconstructed image. In contrast to high numerical aperture microscopy, ptychography offers the chance to control this effect more efficiently as compared to an illumination system with a flat illumination profile used in standard microscopy with Koehler-type illumination.

As used in this invention, a sub-image refers to an image generated using a specific light source or using a specific selection or subset of light sources of the plurality of light sources.

According to a further embodiment of the ptychographic imaging system, the predefined pattern of the plurality of light sources comprises an arrangement of the light sources in a plurality of concentric rings around the central optical axis going through the sample location. For light sources in subsequent rings, a shift in an azimuth angle is substantially uniform. For adjacent light sources within the same concentric ring, a shift in a polar angle is substantially uniform. According to this embodiment, the ptychographic imaging system comprises a uniform theta-phi illuminator, theta being the polar angle, phi being the azimuth angle. This particular arrangement of the light sources removes any variable redundancies of the measurements as compared to conventional illumination methods. Each subsequent light source provides uniform shift in angular separation in both radial and azimuth direction. Preferably, the shift in azimuth angle and the shift in polar angle is chosen to provide uniform 50 percent overlap in the entire Fourier space for all light sources. The arrangement reduces the number of required images for reconstruction, leading to higher throughput. The reconstructed images are free from artifacts which can arise due to regular grid arrangement of light sources.

According to a further embodiment of the ptychographic imaging system, the arrangement of the light sources is planar.

According to a further embodiment of the ptychographic imaging system, the arrangement of the light sources is spherical. According to this arrangement, the distance between the light sources and the sample location is preferably constant. This arrangement has the additional advantage of providing high dynamic range images for light sources located at the edges. This leads to better signal-to-noise ratios for reconstructing images. This arrangement can correct geometric effects resulting from the directivity and from the distance between the light source and the sample.

According to a further embodiment of the ptychographic imaging system, the controller controls the operation of the plurality of light sources by operating a plurality of light sources at the same time. The number of light sources to be operated at the same time is limited by a given maximal number and/or a minimal distance criterion in spatial or angular coordinate space of the light source. For example, if the ptychographic imaging system comprises a plurality of N light sources, there is a reduction of the number of images required from N to N/M, if a plurality of M light sources is used at the same time. This leads to a throughput increase by a factor M.

Multiplexing, i.e., operating a plurality of light sources to reduce the required number of frames, can be advantageous as long as no relevant information is lost, i.e., if it is still possible to differentiate between different diffraction patterns in the Fourier plane. That is, it should be possible to identify regions of structures in Fourier space and limit the regions against each other to assign the regions to the respective light sources. Accordingly, a plurality of diffraction patterns can be separated and extracted from a single frame. To guarantee separability, the signals or structures in Fourier space must decay fast enough that different signals or structures do not merge above noise level. This can be achieved by a minimal angular distance, i.e., by a minimal distance criterion in angular coordinate space. The minimal distance criterion may be selected based on the size of structures of the objects to be analyzed. Multiplexing is particularly advantageous for weakly diffracting structures, having rapidly decaying amplitude distributions in Fourier space. Preferably, the distance is maximized taking into account that diametrically opposed light sources may have overlapping diffraction.

According to a further embodiment of the ptychographic imaging system, the controller controls the operation of the plurality of light sources by selecting a subset of light sources of the plurality of light sources and operating only the light sources in the subset. In Fourier ptychography, instead of scanning the sample in the space domain, scanning is carried out in the Fourier domain. Accordingly, it is determined which Fourier components are present and the respective light devices are identified. The sample is scanned using only the identified light devices. Because all sub-images are generated in consecutive order, using only a subset of light sources can significantly reduce the time required for generating the high-resolution image.

According to a further embodiment of the ptychographic imaging system, the subset of light sources to be operated is selected based on characteristics of the sample to be observed. It may be known that the sample only contains certain elements or structures. Which Fourier components are dominant depends on the sizes and material properties of the elements or structures. Accordingly, only the relevant Fourier components, i.e., only the relevant light sources can be selected based on the characteristics of the sample. For example, if the sample is a blood sample, the controller may select the light sources most relevant for blood samples.

According to a further embodiment of the ptychographic imaging system, the subset of light sources to be operated is selected based on a user input. A user may choose between different types of samples. The light sources for each type of sample can be stored in a memory of the controller. The controller selects the subset of light sources accordingly. To determine the subset, the density of the Fourier spectrum may be determined. If in some region the Fourier spectrum is less dense or no Fourier data is present, the respective light source is not used for measurement. Accordingly, the ptychographic imaging system implements content adaptive illumination.

According to a further embodiment of the ptychographic imaging system, the subset of light sources to be operated is selected based on a previous calibration. The calibration comprises generation of a calibration image of the sample using all light sources or a majority of the light sources. Further, the subset of light sources is selected based on contributions of the light sources to the calibration image.

According to a further embodiment of the ptychographic imaging system, the subset of light sources to be operated is selected dynamically while capturing the set of sub-images based on the evaluation of signal content in Fourier space of sub-images already taken in this set of sub-images by determining areas and/or regions and/or directions of substantial signal contribution with respect to a quality criterion and/or based on signal strength, by selecting light sources for subsequent images which overlap in part or neighbor the area and/or region and/or direction of substantial signal contribution already measured.

According to a further embodiment of the ptychographic imaging system, the sub-images are taken by operating multiple light sources in parallel, by assigning the substantial content in Fourier space to the respective light sources operated prior to selecting light sources to be operated in subsequent frames and determining which of those light sources can be operated at the same time as it is limited by a given maximal number and/or a minimal distance criterion in spatial or angular coordinate space of the light source.

According to a further embodiment of the ptychographic imaging system, the controller controls the operation of the plurality of light sources by adjusting illumination parameters of the light sources depending on a location of the light sources within the arrangement of light sources. Controlling the illumination parameters may be based on a distance of the light source to the sample location and/or an inclination angle of the light source.

According to a further embodiment of the ptychographic imaging system, adjusting illumination parameters comprises an adjustment of at least one of:
 a) a brightness of the light sources,
 b) a duration of operation of the light sources,
 c) an attenuation filter,
 d) a color filter,
 e) exposure time of a detector of the ptychographic imaging system, and
 f) gain setting of a detector of the ptychographic imaging system.

The illumination parameters may be adjusted to a given signal-to-noise ratio of the detector of the ptychographic imaging system. This means that the effective light flux, i.e., amount of light, to the sample and/or from the sample to the detector is controlled. For example, the controller may control the driver current amplitude, switch-on time of the driver current, settings of filter in the optical beam path or may perform exposure control of the detector by controlling gain and/or exposure time. Preferably, the illumination parameters, e.g., at least one of the parameters a) to e), are controlled to reach a given signal-to-noise ratio. Preferably, for each illumination angle, i.e., for each light source, a specific setting for the illumination parameters is determined.

According to a further embodiment of the ptychographic imaging system, at least some of the control can be accomplished by a gain control, i.e., the control of the sensitivity of the detector of the ptychographic imaging system.

According to a further embodiment of the ptychographic imaging system, the controller adjusts illumination parameters depending on an azimuth angle of the light source.

The power density scales with the cosine of the angle of incidence, i.e., the azimuth angle of the light source. This means that light sources for high angles require more power. Accordingly, the controller may adjust the illumination parameters depending on the azimuth angle of the light source, in particular with an inverse of the cosine of the azimuth angle of the light source to compensate for this angular effect.

According to a further embodiment of the ptychographic imaging system, the sub-images generated by the ptychographic imaging system are rescaled to a predetermined set of standard settings of the illumination parameters. Rescaling takes the respective scaling behavior of each of the illumination parameters into account, e.g., linear scaling with exposure time, non-linear scaling of LED driver current for light flux, and the like.

According to a further embodiment of the ptychographic imaging system, compensation is used in an adapted fashion according to the predefined pattern of the light sources. That is, the compensation depends on the geometrical setting of the light sources. For example, the light sources may be arranged in a plane with parallel optical axes or with individually inclined optical axes for at least one of the light sources, where the optical axis is ideally directed onto the center of the field of view of the sample, i.e., the sample location. This arrangement reduces the amount of geometrical correction for the geometrical emission profile of the respective light source. Furthermore, the light sources may be arranged in a spherical geometry to minimize effects arising from the distance of the light source to the sample location. Also, at least one of the light sources may be used and moved to a different location from one image capture to the next in order to cover the full aperture range for the desired image setting. This movement may be operated directly by shifting physically the respective light source like LED or distal output end of an optical fiber or indirectly by re-directing the light beam from the respective light source by e.g., a scanning unit like a galvo-scanner. Based on the respective geometrical setting of the light source with respect to the proper location, the controller determines and uses an adaptive setting for the correction.

According to a further embodiment of the ptychographic imaging system, the controller controls the operation of the plurality of light sources to obtain different intensities for different diffraction angles, i.e., illumination apertures, to provide contrast enhancement intrinsically in the reconstruction process.

According to a further embodiment of the method, controlling the operation of the plurality of light sources comprises the step of operating a plurality of light sources at the same time. The number of light sources to be operated at the same time is limited by a given maximal number and/or a minimal distance criterion in spatial or angular coordinate space of the light source. E.g., a minimum distance in theta-phi space between operated light sources and its neighboring operated light sources has to be fulfilled.

According to a further embodiment of the method, controlling the operation of the plurality of light sources comprises selecting a subset of light sources of the plurality of light sources and operating only the light sources in the subset.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate embodiments of the present invention and serve to explain the principles of the invention together with the description.

Figure 1:
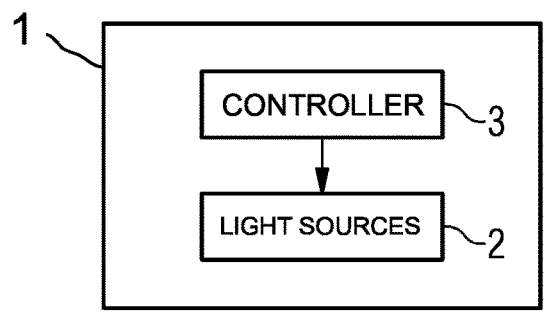

Other embodiments of the present invention and many of the intended advantages of the present invention will be readily appreciated as they become better understood by reference to the following detailed description. Like reference numerals designate corresponding similar parts. It should be understood that method steps are numbered for easier reference, but that the numbering does not necessarily imply steps being performed in that order unless explicitly or implicitly described otherwise. In particular, steps may also be performed in a different order than indicated by their numbering. Some steps may be performed simultaneously or in an overlapping manner.

Figure 2:
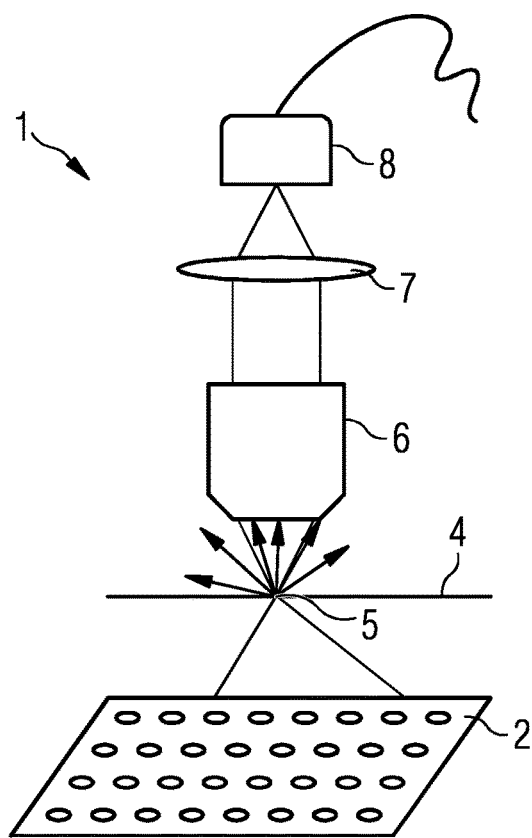
Figure 3:
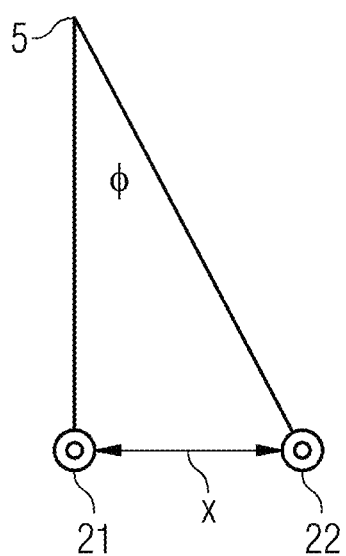
Figure 4:
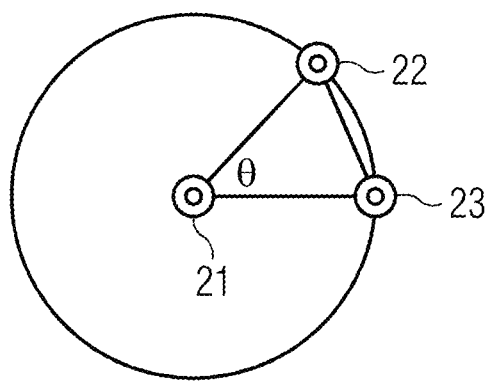
Figure 5:
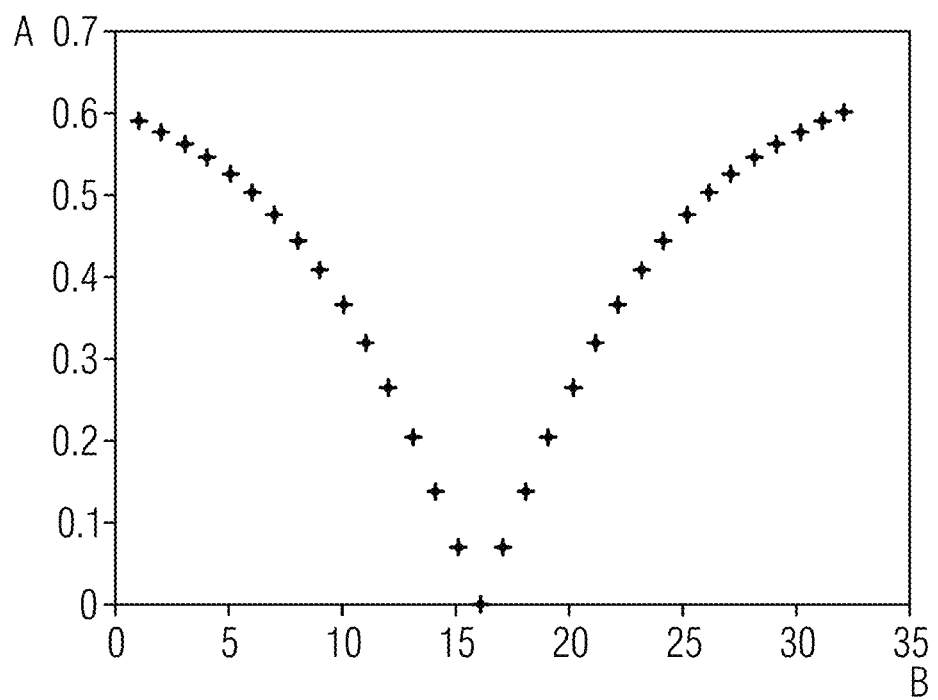
Figure 6:
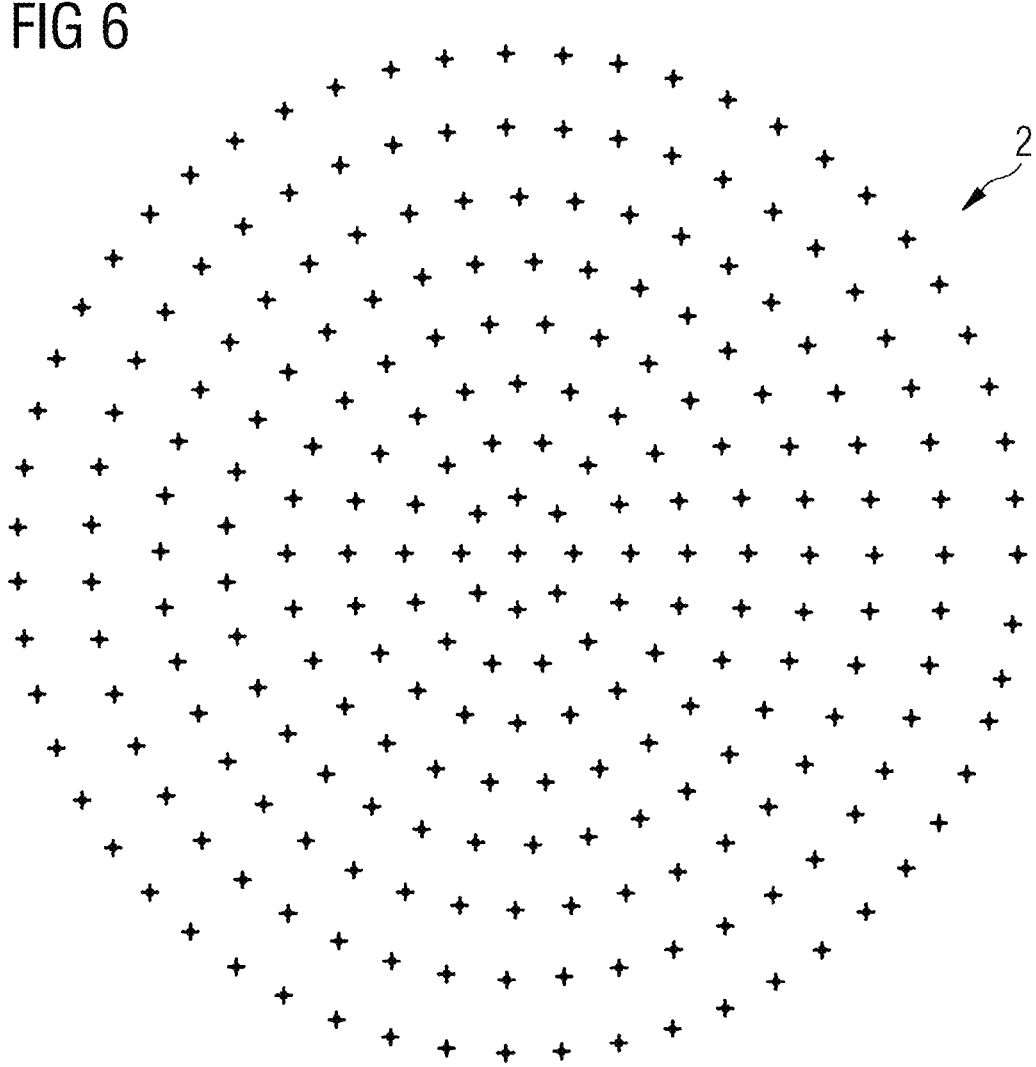
Figure 7:
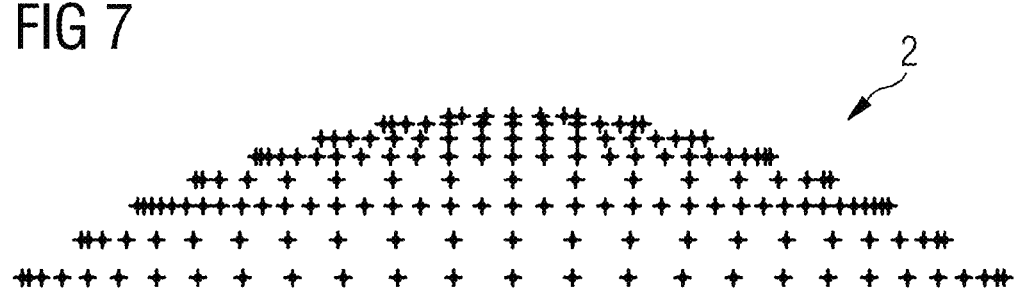
Figure 8:
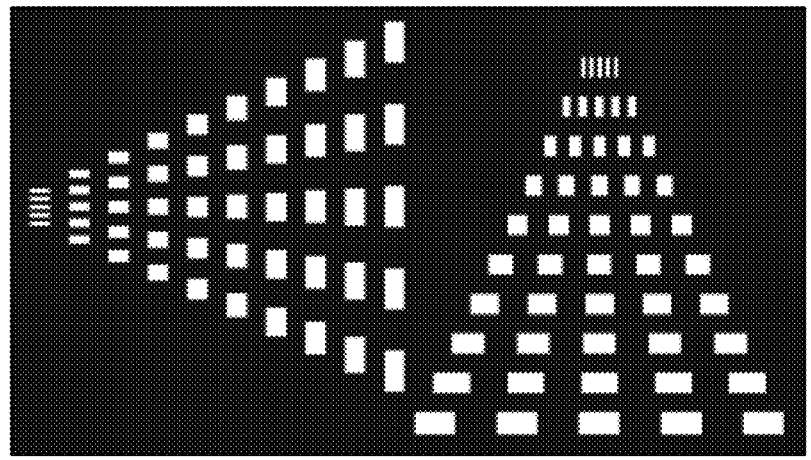
Figure 9:
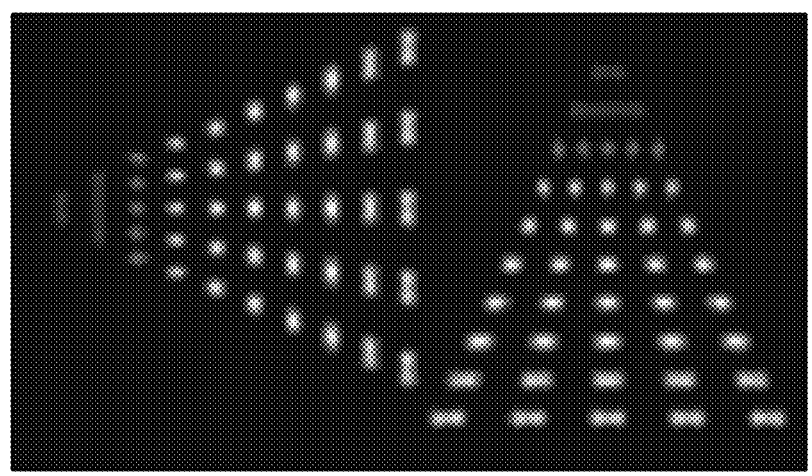
Figure 10:
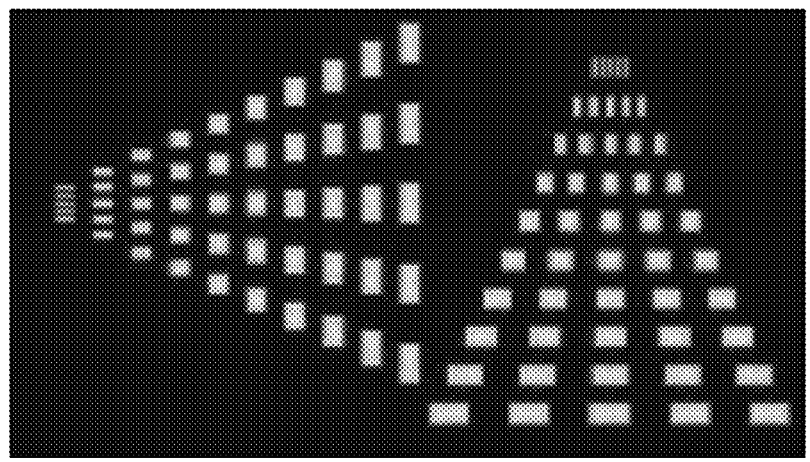
Figure 11:
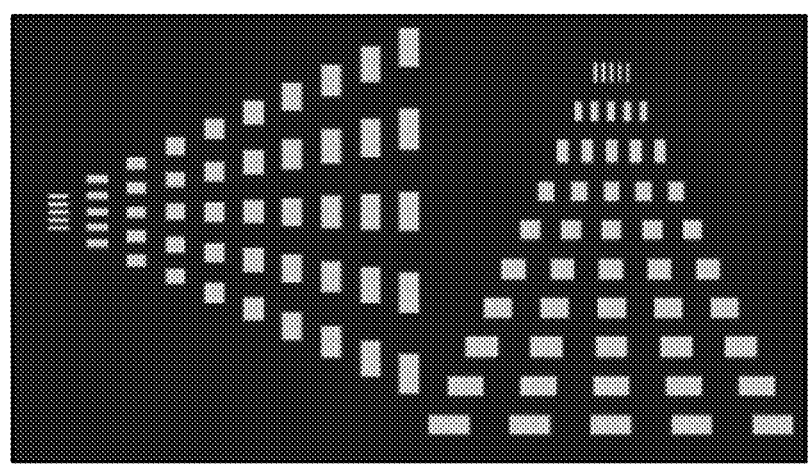
Figure 12:
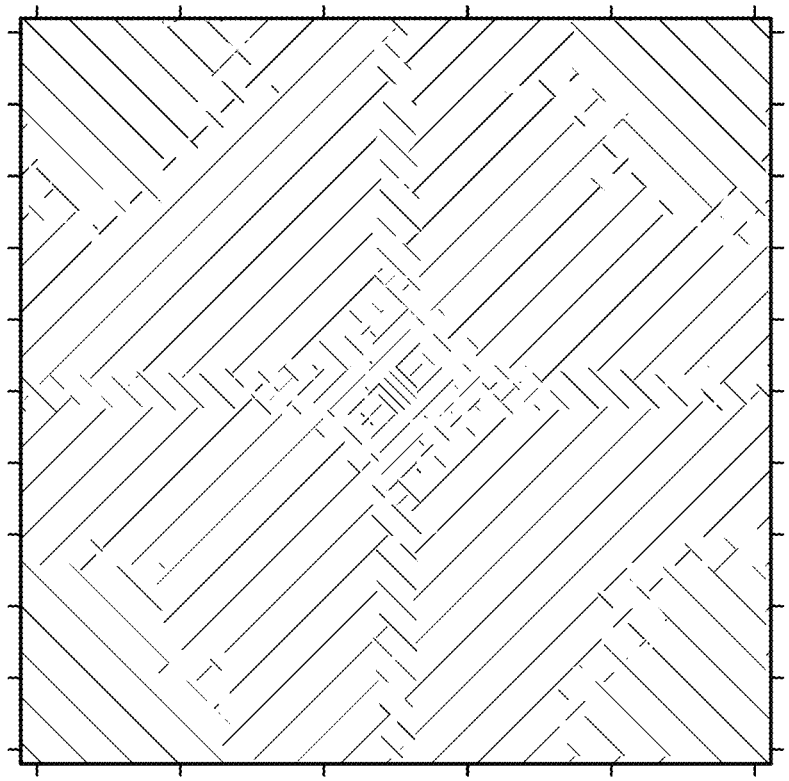
Figure 13:
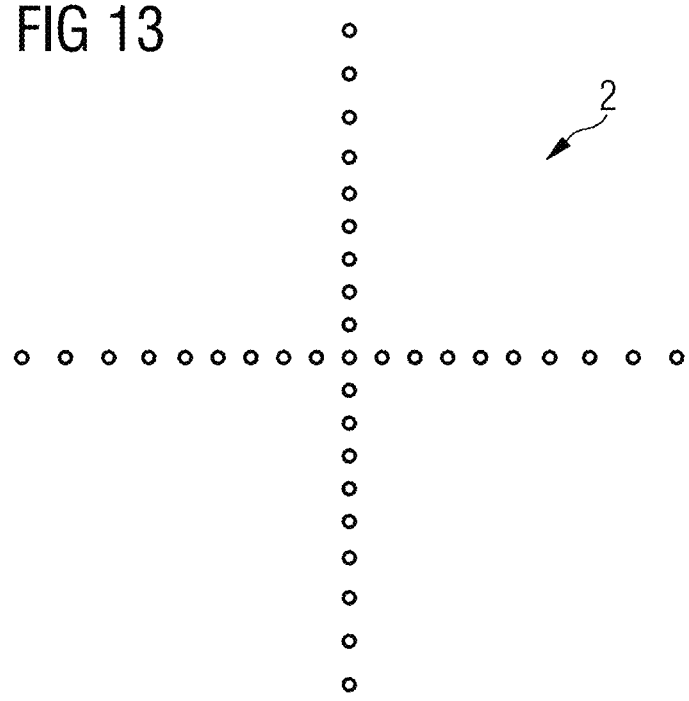
Figure 14:
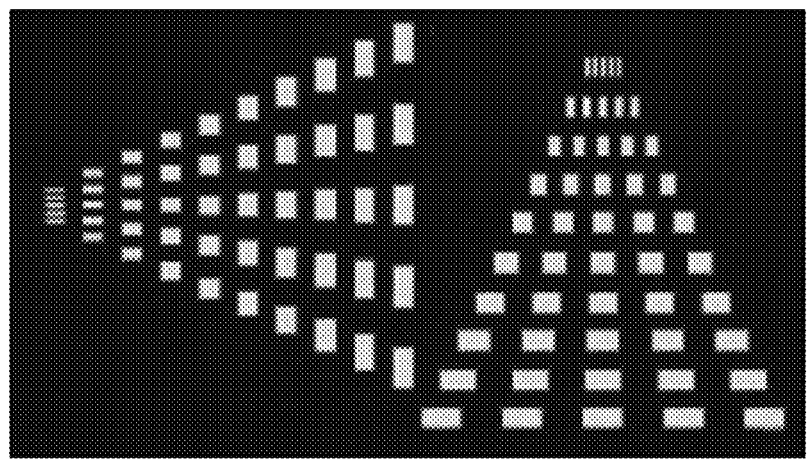
Figure 15:
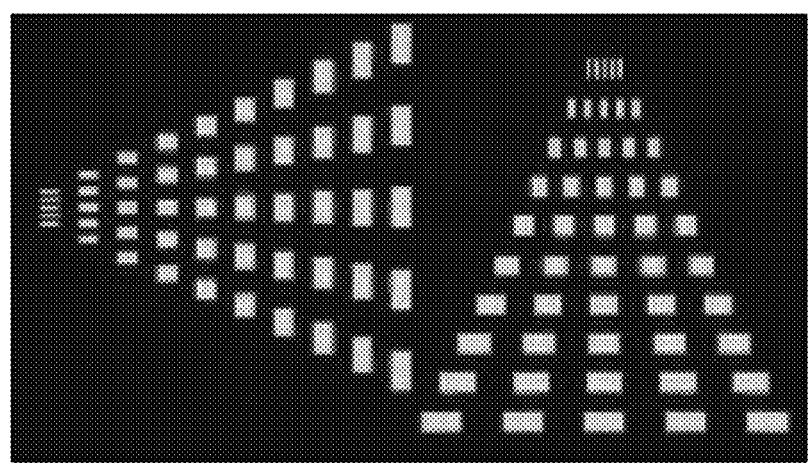
Figure 16:
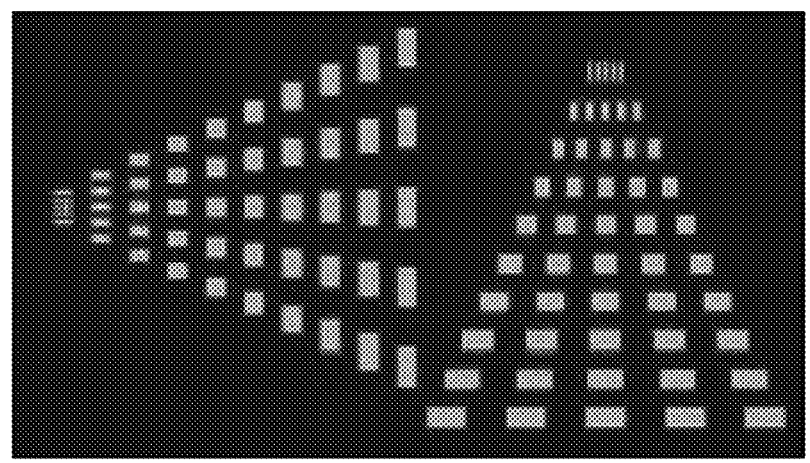
Figure 17:
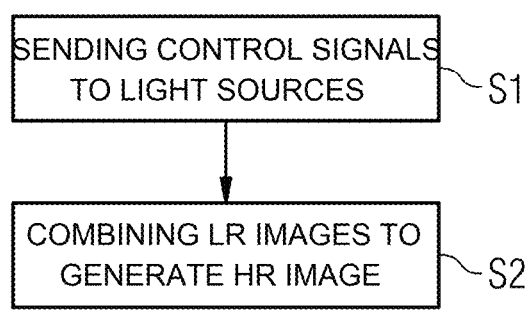

FIG. 1 schematically shows a block diagram illustrating a ptychographic imaging system according to an embodiment of the invention;

FIG. 2 schematically shows a ptychographic imaging system according to an embodiment of the invention;

FIG. 3 illustrates the azimuth angle and the pitch of the arrangement of light sources;

FIG. 4 illustrates the polar angle of the light sources;

FIG. 5 illustrates the illumination numerical aperture for a planar array of light sources as a function of position along an x-axis;

FIG. 6 is a top view of an arrangement of light sources according to an embodiment of the invention;

FIG. 7 schematically illustrates the arrangement of light sources according to FIG. 6 in a side view;

FIG. 8 schematically illustrates a test object used for simulation;

FIG. 9 illustrates a simulated low-resolution image for grid-based conventional illumination;

FIG. 10 illustrates a reconstructed high-resolution image for grid-based conventional illumination;

FIG. 11 illustrates a reconstructed high-resolution image obtained by a ptychographic imaging system according to an embodiment of the invention;

FIG. 12 shows an exemplary Fourier spectrum of the test object;

FIG. 13 shows an exemplary subset of light sources used for ptychographic imaging;

FIG. 14 shows a reconstructed high-resolution image obtained by a ptychographic imaging system according to an embodiment of the invention;

FIG. 15 shows a reconstructed high-resolution image obtained by a ptychographic imaging system according to another embodiment of the invention;

FIG. 16 shows a reconstructed high-resolution image obtained by a ptychographic imaging system according to yet another embodiment of the invention; and FIG. 17 shows a flow diagram of a method for generating images using a ptychographic imaging system according to an embodiment of the invention.

DETAILED DESCRIPTION OF THE INVENTION

FIG. 1 shows a block diagram illustrating a ptychographic imaging system 1. The ptychographic imaging system 1 comprises a plurality of light sources 2, in particular light-emitting devices, LEDs, which emit light onto a sample arranged at a sample location of the ptychographic imaging system 1. The light sources 2 are arranged in a predefined pattern. The overall shape of the arrangement may comprise a planar array or a spherical cap.

The light sources 2 may be arranged in a plurality of concentric rings around a central optical axis. All the light sources 2 within the same concentric ring have the same azimuth angle being measured between a central optical axis and a line from the light source 2 to the sample location. The azimuth angle of the light sources 2 may show a constant shift between adjacent concentric rings. In other words, the difference between the azimuth angle of light sources 2 in different adjacent concentric rings is independent of the concentric rings under consideration.

Likewise, a shift in a polar angle may be uniform for each two light sources 2 selected within the same concentric ring. In other words, the difference between the polar angle of two adjacent light sources in the same concentric ring is independent of the selected light sources 2. In particular, light sources 2 in different concentric rings may have essentially the same shift in polar angle, apart from the deviation due to there being possible only an integer number of light sources 2 within each concentric ring.

A controller 3 of the ptychographic imaging system 1 controls operation of the light sources 2. The controller 3 may comprise at least one of a central processing unit (CPU) or graphics processing unit (GPU) like a microcontroller (µC), an integrated circuit (IC), an application-specific integrated circuit (ASIC), an application-specific standard product (ASSP), a digital signal processor (DSP), a field programmable gate array (FPGA) and the like. The controller 3 may also comprise or have access to a storage. The storage may be a volatile or non-volatile data memory, e.g., a solid-state disk, memory card, or the like. In a preferred embodiment, the controller may have stored a sequence of previously defined subsets of selected LEDs to be operated at a time and recalls these subsets of the sequence during the capture of sub-images for the entire set of sub-images.

At least one light source 2 is activated by the controller 3 at each time for generating a respective sub-image. The controller 3 may operate subsets of the plurality of light sources 2 at the same time. In particular, for each sub-image, the controller 3 may select at least two light sources 2 to be operated. The light sources 2 may be selected according to a predetermined pattern.

The controller 3 may also select a subset of the plurality of light sources 2. Only the selected light sources 2 are operated for generating respective sub-images. One or more light sources 2 can be chosen for generating each sub-image. The light sources 2 that are not selected are not used for generating sub-images. The controller 3 may select the light sources 2 according to instructions stored in the storage.

The controller 3 may select the subsets to be operated in accordance with characteristics of the sample to be observed. The ptychographic imaging system 1 may comprise a user interface for receiving instructions from a user. The user may select one or more options regarding the type of the sample. For each type of sample, respective subsets of light sources 2 are selected by the controller 3.

The controller 3 may also select the light sources 2 based on a previous calibration. During calibration, the controller 3 generates low-resolution sub-images. For generating the sub-images, all light sources 2 are used. In other words, there is no selection during the calibration phase. The controller 3 may then generate a high-resolution image by combining the low-resolution sub-images. The high-resolution image is considered to be a calibration image. Next, the controller 3 may analyze the high-resolution image using Fourier analysis to determine the most contributing Fourier components. For example, only those components with an average value over a certain threshold may be considered to be "most contributing" or relevant. Specific light sources 2 of the plurality of light sources 2 correspond to the respective Fourier components. During operation, the controller 3 only selects the light sources 2 corresponding to the most contributing Fourier components identified during the calibration phase.

The controller 3 may be adapted to control illumination parameters of the light sources 2. The value of the illumination parameter may depend on the location of the light sources 2 within the arrangement of light sources 2. In particular, the illumination parameter may be chosen depending on an azimuth angle of the light source 2, only. In other words, identical illumination parameters are chosen for light sources 2 with the same azimuth angle. For light sources 2 with different azimuth angles, at least some of the illumination parameters differ. The illumination parameters may comprise a brightness of the light source 2, a duration of operation of the light source 2, an attenuation filter, a color filter, a gain value and/or an exposure time of a detector of the ptychographic imaging system 1.

FIG. 2 shows an exemplary ptychographic imaging system 1. The ptychographic imaging system 1 comprises an array of light sources 2. The light sources 2 emit (laser) light onto a sample plane 4 having a sample located at a sample location 5. The sample location is extended. However, because of the small size of the sample location with respect to the dimensions of the distances between adjacent light sources 2, the sample location may in good approximation be considered to be point-like. The sample may comprise samples of solid structures or of fluids, such as blood.

The light emitted by the light sources 2 interacts with the sample, e.g., via absorption, deflection, or reflection. At least part of the light emitted by the light sources 2 goes through the sample at the sample location 5 and enters a microscope objective 6. An imaging lens 7 focuses the light onto a real-plane imaging detector 8. The detector 8 generates sub-images and stores the data, e.g., in the storage of the controller 3. The detector 8 may also provide the data to an external processing unit, such as an external computer for analyzing the data.

Whereas FIG. 2 shows a uniform array of light sources 2, the array of light sources 2 may generally have different arrangements, such as nonuniform spacing between light sources 2. In particular, the arrangement may comprise a uniform shift in an azimuth angle and/or polar angle. In addition, the different arrangement may comprise also that different kinds of light sources may be installed at different locations within the ptychographic illuminator. The different kind of light sources may be chosen from but not limited to the following types: light emitting devices (LED) of monochrome or single-bandwidth emission or emission in multiple bandwidth like RGB LEDs, S-LEDs, lasers, especially semiconductor lasers, thermal emitters, fiber based light sources, etc. The light sources may differ in, e.g., at least one of the following characteristics: wavelength, spectral bandwidths, spatial emission characteristics, temporal emission characteristics like continuous or pulsed operation, coherence parameters like degree of temporal and/or spatial coherence, brightness or etendue.

FIG. 3 illustrates the azimuth angle (and the pitch x of the arrangement of light sources 2. The azimuth angle $\varphi$ is an angle measured between the central optical axis going through a central light source 21 and extending to the sample location 5, and a line extending between the respective light source 22 and the sample location 5. The pitch x corresponds to the distance between two adjacent light sources 21, 22.

FIG. 4 illustrates the polar angle $\theta$ of the light sources 2. The polar angle $\theta$ of a certain light source 22 corresponds to the angle between a line between the light source 22 and the central light source 21 and another line between a predetermined light source 23 and the light source 21. The predetermined light source 23 is arbitrarily chosen as a reference. Of importance is the shift in polar angle, i.e., the difference between the polar angles of two adjacent light sources 22, 23 within the same concentric circle, which is independent of the reference.

FIG. 5 illustrates the illumination numerical aperture A for a conventional uniform planar array of light sources 2 as a function of position B along an x-axis. Each light source illumination provides separated measurements in Fourier space. Such multiple separated measurements are used for the reconstruction of a high-resolution high-field-of-view image. For accurate reconstruction of images, it is necessary to have at least 50 percent overlap between the Fourier spectra measured by neighboring light-emitting devices 2. In the center, the overlap between adjacent light-emitting devices 2 may be around 55 percent. As can be observed from FIG. 5, the illumination numerical aperture does not increase linearly. This leads to an increasing overlap between Fourier spectra of adjacent light sources 2 towards the periphery. To account for this problem, a specific arrangement of the light sources 2 can be chosen.

FIG. 6 schematically illustrates an arrangement of light sources 2 in a top view.

FIG. 7 schematically illustrates a side view of the arrangement of light sources 2 according to FIG. 6. The light sources 2 are arranged in concentric circles around a central optical axis. The shift in azimuth angle φ is chosen to be uniform and the shift in polar angle θ between light sources 2 in the same concentric circle is also chosen to be substantially uniform. In other words, the ptychographic imaging system 1 comprises a uniform theta-phi illuminator.

Preferably, the angular orientation of each concentric ring is selected statistically or randomly. In other words, additional symmetries are preferably avoided in order to prevent the occurrence of artifacts. For example, such artifacts may occur if there exists a great circle (or meridian) on the sphere which comprises a light source 2 for each concentric ring. Preferably, the light sources 2 are not arranged along meridians.

Whereas FIG. 6 and FIG. 7 show a spherical uniform theta-phi illuminator, the light sources 2 may also be arranged in a plane, thereby providing a planar uniform theta-phi illuminator. In the planar case, additional symmetries are again preferably avoided, too. Therefore, LEDs of different rings are not arranged on straight radial lines which would correspond to the meridians of the spherical case.

For determining such an arrangement, first, the polar angle may be determined such that in a radial direction, consecutive light sources 2 have an overlap in Fourier spectrum of around 50 percent. These polar angles and the expected maximum numerical aperture are used to find the number of rings of light sources 2. Each ring is going to be arranged at uniform polar angle steps to make sure that there is uniform overlap in the radial directions.

For example, the ideal pitch for a numerical aperture of 0.1 may be around 5 mm. Most high-power LEDs have a footprint of around 2 to 3 mm. If the height, i.e., the distance between the central light source 21 and the sample location 5 is chosen to be 70 mm, there is an overlap of about 55% in Fourier spectrum. From the pitch x and the height, the azimuth angle can be computed according to the following formula:

$$\varphi = \tan^{-1}(\text{pitch/height}) = 4.08°.$$

Next, the locations of the light sources 2 along an axis are determined based on a synthetic aperture requirement. For example, if a synthetic aperture needs to be 0.6, the illumination numerical aperture needs to be at least around 0.5, making use of the numerical aperture of 0.1 of the lens by diffraction. The maximum azimuth angle can be computed according to the following formula:

$$\varphi_{max} = \sin^{-1}(0.5) = 30°.$$

In the following we will use $\varphi_{max} = 32°$. The radius of each circle can be calculated according to the following formula:

$$r = \text{height} \cdot \tan(n\varphi),$$

where n=1, 2, . . . . The maximum radius depends on the required effective numerical aperture. To achieve an illumination numerical aperture of 0.5, a central light source 2 surrounded by 7 rings with additional light source 2 are required.

The radii of the circles are given by the following values (in mm):

4.8949, 9.8379, 14.8790, 20.0722, 25.4779, 31.1660, 37.2197.

Light sources 2 located at these radii will maintain uniform overlap along the radial direction.

Next, it is described how to find the azimuthal location of the light sources 2 on each circle such that there is uniform overlap along the azimuthal direction.

First, the number of light sources 2 for the first circle is calculated using the following formula for the shift in polar angle θ between adjacent light sources 2:

$$\Delta\theta = \tan^{-1}(\text{pitch/radius}) = 45.6°.$$

Accordingly, 360/45=8 light sources 2 are required for the first circle.

Likewise, the shift in azimuth angle is computed for the respective circles to have the following values:

45.6086, 26.9414, 18.5746, 13.9877, 11.1031, 9.1144, 7.6512

The respective numbers of light sources 2 are calculated to be:

7.8933, 13.3623, 19.3813, 25.7368,
32.4234, 39.4981, 47.0517, 55.

Rounding to the nearest larger integer for not violating the overlap criterion in the pupil by at least 50%, gives the number M of light sources 2 for each circle n:

8, 14, 20, 26, 33, 40, 47, 55.

The angular step size $\Delta\theta_n$ for ring n is calculated by:

$$\Delta\theta_n = 360/M_n$$

where $M_n$ denotes the respective number M of light sources in Ring n.

The location of each light source 2 can be found using the angular coordinates and the radius using the following formula:

$$[x,y] = [r \cdot \cos(m \cdot \Delta\theta_n), r \cdot \sin(m \cdot \Delta\theta_n)].$$

In this formula, r denotes the radius of each light source 2 and m varies from 1 to the maximum number $M_n$ of light sources 2 on circle n. According to a preferred embodiment for avoiding additional symmetries, for each ring n, a (possibly different) statistical angle $\Delta\theta_{n0}$ may be added, which could be determined from:

$$\Delta\theta_{n0} = Rn \cdot \Delta\theta_n$$

Where Rn denotes at least one random number in the range [0;1] for all rings or preferably a different random number for every ring from the range [0;1]. Due to the different values of $\Delta\theta_n$ even one random number would help to avoid additional symmetries. The location of light sources 2 would then be found by the angular coordinates, angular offset, and respective radius of ring n by the formula:

$$[x,y] = [r \cdot \cos(m \cdot \Delta\theta_n + \Delta\downarrow_{n0}), r \cdot \sin(m \cdot \Delta\theta_n + \Delta\downarrow_{n0})]$$

For the design of spherically uniform theta-phi-arrays, similar steps are used to find the polar angle and the azimuth angle. The only difference compared to the planar array is that the coordinates of the light sources are determined using the following equation:

$$x = \text{height} \cdot \sin(n \cdot \varphi) \cdot \sin(m_n \cdot \Delta\theta_n),$$

$$y = \text{height} \cdot \sin(n \cdot \varphi) \cdot \cos(m_n \cdot \Delta\theta_n),$$

$$z = \text{height} \cdot \cos(n \cdot \varphi).$$

According to this formula, n varies from 1 to the maximum radius number. $\Delta\theta_n$ denotes the azimuthal step size in ring number n. $m_n$ denotes the number of the respective light sources 2 in ring number n, ranging from 1 to $M_n$. For a preferred embodiment, the statistical angle $\Delta\theta_{n0}$ can be added accordingly.

The light sources in the arrangements described in the preceding FIGS. may comprise at least one out of the following: semiconductor based light source, like LED, SLED, semiconductor laser, e.g., VCSEL, gas lasers, white light lasers, e.g., fiber crystal lasers, fluorescence based or broadening light source, e.g., white light LEDs, thermal light sources, e.g., halogen lamps, arc lamps, e.g., Xe—Hg lamps, fiber based light source, where any of the preceding light sources might be coupled into the fiber and the output end of the fiber might serve as a light source. Furthermore, these light sources might be coupled with beam forming optical elements like a collimator or focusing optics to optimize the etendue radiated onto the sample area 5 under investigation. Collimator optics might be chosen from but not limited to the following: lenses, GRIN lenses, diffractive optical elements (DOE), refractive optical elements, e.g., Fresnel lenses, computer generated holograms.

FIG. 8 schematically illustrates a test object which serves as a ground truth for a simulation. Generating images of the test object is simulated for different ptychographic imaging systems, including conventional ptychographic imaging systems with planar uniform arrays of light sources 2.

FIG. 9 illustrates a simulated low-resolution image for such a grid-based conventional illumination having a 0.1 numerical aperture objective. As can be observed, the quality is relatively poor and small structures are not resolved.

FIG. 10 illustrates a reconstructed high-resolution image for grid-based conventional illumination, based on stitching of a plurality of low-resolution images. In total, 289 low-resolution images have been combined to obtain the high-resolution image shown in FIG. 10.

FIG. 11 illustrates a reconstructed high-resolution image obtained by a ptychographic imaging system 1 with a uniform theta-phi illuminator according to the invention. Because of the specific arrangement, for the same numerical aperture as used for the conventional imaging system, a lower number of only 244 images is required to reconstruct the high-resolution image.

In the following, a ptychographic imaging system 1 is described, wherein the controller 3 operates the plurality of light sources 2 by selecting a subset of light sources 2 of the plurality of light sources 2 and by operating only the selected light sources 2 in the subset.

FIG. 12 shows an exemplary Fourier spectrum of the test object shown in FIG. 8. It can be seen that the test object has significant Fourier components only along the x-axis and y-axis. Accordingly, the number of light sources 2 to be operated can be restricted without losing significant information.

FIG. 13 shows an exemplary subset of light sources 2 used for ptychographic imaging. Only the light sources 2 along the x-axis and along the y-axis are selected for generating respective low-resolution images.

In addition or alternatively, multiple light sources 2 can be used at the same time. For example, for each low-resolution image, two light sources 2 may be selected and are turned on to capture the respective low-resolution image.

FIG. 14 shows a reconstructed high-resolution image obtained by a ptychographic imaging system 1 with a uniform theta-phi illuminator according to the invention. The high-resolution image is reconstructed from low-resolution images using multiple-LED illumination with two light sources 2 being used for each low-resolution image. The high-resolution image has been obtained by merging a total number of 122 low-resolution images in the ptychographic reconstruction process.

FIG. 15 shows a reconstructed high-resolution image obtained by a ptychographic imaging system 1 with a uniform theta-phi illuminator according to the invention. For generating low-resolution images, content adaptive selection of light sources 2 has been employed. Accordingly, only the light sources 2 depicted in FIG. 13, i.e., only light sources 2 along the x-axis and y-axis are used for generating the low-resolution images. The high-resolution image has been obtained by stitching a total number of 31 low-resolution images.

FIG. 16 shows a reconstructed high-resolution image obtained by a ptychographic imaging system 1 with a uniform theta-phi illuminator according to the invention. In addition to multiple-LED illumination using two light sources 2 at the same time, content adaptive selection of light sources 2 has been employed. The content adaptive selection may be based on a prior knowledge about the object. Accordingly, only the light sources 2 depicted in FIG. 13, i.e., only light sources 2 along the x-axis and y-axis are used for generating the low-resolution images. The ptychographic imaging system 1 therefore combines multiple-LED illumination with content adaptive selection of light sources 2. The high-resolution image has been obtained by reconstructing a total number of 19 low-resolution images.

In general, for a given object, the orientation of the pattern of Fourier components in the pupil plane or in the Fourier transform of the image, respectively, strongly depends on the orientation or three-dimensional pose of the object in the object space of the imaging system.

In FIG. 16 the axis of the test pattern is aligned with the x-axis and y-axis of the sensor array of the imaging system. Furthermore, the quadratic grid of light sources was also aligned with respect to the object's x- nd and y-axis. Therefore, the Fourier pattern of the transformed image in the spatial frequency domain is aligned with the x-axis and y-axis of the detector and thus the image frame and the light sources to be selected are also chosen to be aligned with the x-axis and y-axis of the grid of light sources 2 intersecting on the optical axis of the imaging system.

Table 1 below compares different ptychographic imaging systems 1. It can be seen that using uniform theta-phi illuminators, multiple-LED illumination, and content-adaptive illumination can help to reduce the number of images required for reconstruction. If all three measures are employed at the same time, the number of images required for reconstruction is reduced from 289 to only 19. Accordingly, the time required to generate the low-resolution images for reconstructing the high-resolution images is considerably reduced.

TABLE 1

| Measurement Scenario | Throughput (number of images required for reconstruction) |
| --- | --- |
| Conventional imaging system with sequential illumination | 289 |
| Uniform theta-phi illuminator, sequential illumination | 244 |
| Uniform theta-phi illuminator, multi-LED illumination (two light sources turned on at a time) | 122 |
| Uniform theta-phi illuminator, content adaptive illumination, | 31 |
| Uniform theta-phi illuminator, content adaptive illumination, multiple LED illumination (two light sources turned on at a time) | 19 |

In general, if light sources are to be selected based on a prior knowledge of the object's image spatial frequency structure, it is essential to determine at first the spatial orientation or pose of the object or geometric main axis representing the object's coordinate system in the object space of the imaging system, first. In a consecutive step the predefined subset of light sources 2 to be used in the imaging process gets adopted in its angular orientation with respect to the orientation or main axis of the object as it is positioned in the object space of the imaging system.

Another alternative approach on content adaptive selection of light sources 2 may be based on taking images in a first step and on an analysis of Fourier components incorporated in the images in a second step. Based on the strength of the contribution of a respective light source 2 to the signal when reconstructing the object, the light source 2 might be selected or unselected to be part of a subset of light sources 2 used in a later replication of the imaging of the same object or the same kind of object in the imaging system. Again, it is important that the orientation of the object measured is identical to the orientation of the same or the reference object when the light sources 2 were selected adaptive to the spatial frequency content of the object. In case of any misalignment, an adoption to the selection of light sources 2 as described for the case of a prior knowledge in the preceding section has to be applied.

The content adaptive selection may also be based on iteratively checking higher orders of spatial frequency components in the object images. Preferably, first images are taken with a low illumination aperture like on axis illumination based on the central light source 2 or low aperture illumination from light sources with lower ring number n. When the spatial frequency content of this image or a subset of images with low aperture illumination is determined, light sources in the rings of next higher number n are selected preferably in those radial directions, where substantial Fourier components for lower spatial frequencies have already been selected. Whether a radial direction has a substantial Fourier component can be judged based on an appropriate metric like, e.g., a threshold for absolute intensity of the Fourier component or compared to neighboring regions of the respective area or relative to the average of the other Fourier components with the same radial distance or relative to the background noise level as it would be expected for that radial distance. Since this method does not depend on reference information from a prior knowledge or taking images in a first step, there is no need to do any angular correction when selecting light sources 2 and applying them to consecutive images. On the other hand, the iterative checking method might be beneficial for selecting light sources 2 on a first object and to use the defined subset of light sources for consecutive measurements on comparable objects. Only when applying this subset of light sources 2 to another object an angular adoption of the light sources 2 selected to the respective orientation of the second object might be applied.

The content adaptive selection may even be performed dynamically while taking images. For the start, a first image is captured with low illumination aperture angle, preferably for on axis illumination. A Fourier transform of this image is determined. In this Fourier transform, areas or regions or directions of a sequence of peaks in a radial axis get determined where a substantial signal contribution is determined. Due to the overlap criterion for the Fourier space to select light sources 2, those neighboring light sources 2 get selected which overlap with their respective illumination aperture with the areas, regions, or directions of radial axis. The next image is taken for that light source or multiple light sources, where the maximum substantial signal contribution is in the overlap area in aperture space. When multiple light sources 2 are applied, the minimal distance criterion in spatial or angular coordinate space of the light source 2 might be obeyed. When the next image is taken, the evaluation is performed analogously to the first image.

From the determined areas, regions, and/or directions of radial axis of the two images, the next image is taken for that light source or multiple light sources, where the maximum substantial signal contribution is in the overlap area in aperture space. The procedure is carried on with further images until there is no substantial signal contribution any more or if all remaining areas, regions, or directions of radial axis do not have any substantial contribution with additional light sources 2 not used so far. This situation can be considered as a termination criterion. After the subset of images is complete or the termination criterion is reached, the ptychographic evaluation is applied on this subset of images to determine the high-resolution image.

FIG. 17 shows a flow diagram of a method for generating images using a ptychographic imaging system 1. The method can be performed with any of the above-described ptychographic imaging systems 1.

The ptychographic imaging system 1 comprises a plurality of light sources 2 which are arranged in a predetermined pattern. The light sources 2 may be arranged in a plurality of concentric rings around a central optical axis going through a sample location 5 of the ptychographic imaging system 1. A shift in an azimuth angle for light sources in subsequent rings may be substantially uniform. Moreover, a shift in polar angle for adjacent light sources within the same concentric ring may be substantially uniform. The arrangement of light sources 2 can be planar or spherical or any other geometric shape to support application specific optimizations. E.g., in plane arrangements, the light sources can be tilted with respect to the plane according to their respective distance from the optical axis. Then, the setup provides a non-uniform grid of individual light sources, each of them tilted with its respective angle with respect to the optical axis so that in essence all the optical axes of all the light sources intersect in a point or a small region 5 in the sample plane. This arrangement helps to minimize the effect of spatially non-uniform emission characteristics of a light source 2 as typically seen on more directed emission profile e.g., of LED, fibers, fiber bundles, lasers with a slow and fast axis, or VCSELs.

In a first method step S1, a controller 3 sends control signals to the light sources 2 in order to operate the light sources 2 to emit (laser) light onto a sample on the sample location 5 of the ptychographic imaging system 1.

The controller 3 may control the operation of the plurality of light sources 2 by operating a plurality of light sources 2 at the same time. In other words, each low-resolution image is generated by using a plurality of light sources 2. For example, each low-resolution image may be obtained by using two light sources 2.

The controller 3 may also control the operation of the plurality of light sources 2 by selecting a subset of light sources 2 of the plurality of light sources 2 and by operating only the light sources 2 in the subset. For example, the controller 3 may only select light sources 2 along the x-axis and y-axis, as shown in FIG. 13. The selection of the light sources can be based on characteristics of the sample to be observed or measured. The selection can also be based on a user input. For example, the user may select between several types of samples and the controller 3 selects the light sources 2 corresponding to the selected type of sample. Which light sources 2 are to be selected for the respective type of sample can be stored in a lookup table in the memory of the ptychographic imaging system 1. The controller 3 selects the light sources 2 using the lookup table. Sample type specific look up tables could be provided as presets to the user.

The subset of light sources 2 can also be selected based on a previous calibration. During calibration, low-resolution images are generated using one or more of the light sources 2. All of the light sources 2 or at least a majority of the light sources 2 are used for generating respective low-resolution images. In the end, the low-resolution images are combined to generate a calibration image. The calibration image is analyzed, e.g., using Fourier analysis, in order to determine the most significant contributions of the light sources 2. For example, only light sources 2 are selected which correspond to Fourier components that contribute to the Fourier spectrum of the calibration image and exceed a predetermined threshold. This selection of "useful" light sources can also be performed dynamically in real time during the image capture process of the low resolution images to minimize and optimize the image capture and to skip illuminations in regions neighboring an LED where no significant contribution in the Fourier component was measured or where the respective intensity is very low on signal relative to background level.

The controller 3 may further control the operation of the plurality of light sources 2 by adjusting illumination parameters of the light sources 2 depending on the location of the light sources 2 within the arrangement of light sources 2. In particular, the controller 3 may adjust a brightness of the light sources 2, a duration of operation of the light sources 2, an attenuation filter, a color filter, a gain and/or an exposure time of a detector of the ptychographic imaging system 1.

The illumination parameters may be adjusted to reduce or eliminate geometric effects due to the arrangement of the light sources 2. For example, the illumination parameters can be adjusted depending on an azimuth angle of the light source 2, e.g., depending on a cosine of the azimuth angle of the light sources 2.

In a further method step S2, the plurality of low-resolution (LR) images generated by one or more of the light sources 2 is combined in order to generate a high-resolution (HR) image.

In further method steps, the high-resolution image can be further analyzed, e.g., in order to detect specific components or structures in the high-resolution image. The analysis may employ standard image analysis tools.

It should be understood that all advantageous options, variance in modifications described herein and the foregoing with respect to embodiments of the ptychographic imaging system according to the first aspect may be equally applied to embodiments of the method according to the second aspect, and vice versa.

In the foregoing detailed description, various features are grouped together in one or more examples for the purpose of streamlining the disclosure. It is to be understood that the above description is intended to be illustrative, and not restrictive. It is intended to cover alternatives, modifications, and equivalents. Many other examples will be apparent to one skilled in the art upon reviewing the above specification.

LIST OF REFERENCE SIGNS

1 Ptychographic imaging system
2 Light sources
3 Controller
4 Sample plane
5 Sample location
6 Microscope objective
7 Imaging lens
8 Imaging detector
21-23 Light sources
A Illumination numerical aperture
B Position
x Pitch
θ Polar angle
φ Azimuth angle
S1 First method step
S2 Second method step

The invention claimed is:

1. A ptychographic imaging system, comprising:
a plurality of light sources adapted to emit light onto a sample location, wherein the light sources are arranged in a predefined pattern; and
a controller adapted to control operation of the plurality of light sources;
wherein at least one of a) the predefined pattern of the light sources and b) the operation of the plurality of light sources is adapted to compensate for geometric effects due to an arrangement of the light sources relative to the sample location; and
wherein the controller is adapted to control the operation of the plurality of light sources by operating a subset of the plurality of the light sources at the same time to generate a first plurality of sub-images, wherein the subset of the plurality of light sources comprises only those light sources of the plurality of light sources that contribute to a calibration image and exceed a predetermined threshold, the calibration image generated during calibration of the ptychographic imaging system from a second plurality of low-resolution sub-images, the second plurality of low-resolution sub-images generated by at least a majority of the plurality of light sources, the first plurality of sub-images less than the second plurality of low-resolution sub-images.

2. The ptychographic imaging system according to claim 1, wherein the predefined pattern of the plurality of light sources comprises an arrangement of the light sources in a plurality of concentric rings around a central optical axis extending through the sample location;
wherein, for light sources in subsequent rings, a shift in an azimuth angle is substantially uniform, wherein the azimuth angle of a light source is measured between the central optical axis and a line from the light source to the sample location; and
wherein, for adjacent light sources within the same concentric ring, a shift in a polar angle is substantially uniform.

3. The ptychographic imaging system according to claim 1, wherein the arrangement of the light sources is planar.

4. The ptychographic imaging system according to claim 1, wherein the arrangement of the light sources is spherical.

5. The ptychographic imaging system according to claim 1, wherein the controller is adapted to control the operation of the plurality of light sources comprising the step of selecting the subset of the plurality of light sources and operating only the light sources in the subset.

6. The ptychographic imaging system according to claim 1, wherein the subset of light sources to be operated is selected based on the calibration of the ptychographic imaging system, wherein the calibration comprises the following steps:
generating the second plurality of low-resolution sub-images, each of the second plurality of low-resolution sub-images generated from a respective one or more of the plurality of light sources;

combining the second plurality of low-resolution sub-images to generate the calibration image of a sample; and selecting the subset of light sources that correspond to Fourier components that contribute to the Fourier spectrum of the calibration image and exceed the predetermined threshold.

7. A ptychographic imaging system, comprising:
a plurality of light sources adapted to emit light onto a sample location, wherein the light sources are arranged in a predefined pattern; and
a controller adapted to control operation of the plurality of light sources;
wherein at least one of a) the predefined pattern of the light sources and b) the operation of the plurality of light sources is adapted to compensate for geometric effects due to an arrangement of the light sources relative to the sample location;
wherein the controller is adapted to control the operation of the plurality of light sources comprising the step of selecting a subset of the plurality of light sources and operating only the light sources in the subset;
wherein the subset of light sources to be operated is selected dynamically while capturing a set of sub-images based on an evaluation of signal content in Fourier space of sub-images already taken in this set of sub-images by determining areas or regions or directions of substantial signal contribution with respect to a quality criterion or based on signal strength, by selecting light sources for subsequent images which overlap in part or neighbor the area or region or direction of substantial signal contribution already measured; and
wherein the set of sub-images is taken by operating multiple light sources in parallel, by assigning the substantial content in Fourier space to the respective light sources operated prior to selecting light sources to be operated in subsequent frames and determining which of those light sources can be operated at the same time based on a given maximal number or a minimal distance criterion in spatial or angular coordinate space of the light source.

8. The ptychographic imaging system according to claim 1, wherein the controller is adapted to control the operation of the plurality of light sources comprising the step of adjusting illumination parameters of the light sources depending on a location of the light sources within the arrangement of light sources.

9. The ptychographic imaging system according to claim 8, wherein the adjusting the illumination parameters comprises an adjustment of at least one of: a brightness of the light sources, a duration of operation of the light sources, an attenuation filter, a color filter, and a gain and exposure time of a detector of the ptychographic imaging system.

10. The ptychographic imaging system according to claim 8, wherein the controller is adapted to adjust the illumination parameters depending on an azimuth angle of the light source.

11. A method for generating images using a ptychographic imaging system comprising a plurality of light sources arranged in a predefined pattern, the method comprising:
emitting, by the plurality of light sources, light onto a sample location comprising a sample; and
controlling, by a controller, operation of the plurality of light sources;
wherein at least one of a) the predefined pattern of the light sources and b) the operation of the plurality of light sources is adapted to compensate for geometric effects due to an arrangement of the light sources relative to the sample location; and
wherein the controlling the operation of the plurality of light sources comprises selecting a subset of the plurality of light sources for generating a first plurality of sub-images and operating only the light sources in the subset, the method further comprising:
generating a high-resolution calibration image of a sample from a second plurality of low-resolution sub-images generated by using all of the plurality of light sources, the first plurality of sub-images less than the second plurality of low-resolution sub-images; and
selecting the subset of the plurality of light sources based on Fourier analysis wherein the subset of the plurality of light sources corresponds to Fourier components with an average value over a certain threshold.

12. The method according to claim 11, wherein the controlling the operation of the plurality of light sources comprises the step of operating the subset of the plurality of the light sources at the same time, wherein a number of the light sources to be operated at the same time is limited by a given maximal number or a minimal distance criterion in spatial or angular coordinate space of the light source.

13. The ptychographic imaging system according to claim 1, wherein the plurality of light sources has N light sources and a number of the light sources to be operated at the same time is limited by a given maximal number M or a minimal distance criterion in spatial or angular coordinate space of the light source, wherein M is greater than 1 and less than or equal to N.

* * * * *